(12) United States Patent
Sagardoyburu

(10) Patent No.: US 9,645,286 B2
(45) Date of Patent: May 9, 2017

(54) METHOD FOR FABRICATING A DISPLAY DIAL FOR A PORTABLE OBJECT SUCH AS A TIMEPIECE AND DISPLAY DIAL OBTAINED THEREBY

(71) Applicant: The Swatch Group Research and Development Ltd, Marin (CH)

(72) Inventor: Michel Sagardoyburu, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 21 days.

(21) Appl. No.: 14/926,211

(22) Filed: Oct. 29, 2015

(65) Prior Publication Data

US 2016/0178807 A1 Jun. 23, 2016

(30) Foreign Application Priority Data

Dec. 23, 2014 (EP) .................................. 14200000

(51) Int. Cl.
| | | |
|---|---|---|
| G02B 27/02 | (2006.01) |
| G02B 1/118 | (2015.01) |
| B29C 39/02 | (2006.01) |
| G04B 19/12 | (2006.01) |

(52) U.S. Cl.
CPC ............ G02B 1/118 (2013.01); B29C 39/026 (2013.01); G04B 19/12 (2013.01)

(58) Field of Classification Search
CPC ........ G02B 1/118; G04B 19/12; G04B 19/06; B29C 39/026
USPC ........................... 359/436, 440; 264/494, 496
See application file for complete search history.

(56) References Cited

U.S. PATENT DOCUMENTS

| | | |
|---|---|---|
| 2014/0242273 A1 | 8/2014 | Poffet et al. |
| 2014/0246806 A1 | 9/2014 | Poffet et al. |
| 2014/0319741 A1 | 10/2014 | Poffet et al. |

FOREIGN PATENT DOCUMENTS

| | | |
|---|---|---|
| EP | 2 578 372 A1 | 4/2013 |
| EP | 2 579 106 A1 | 4/2013 |
| EP | 2 579 108 A1 | 4/2013 |
| JP | 58-219475 | 12/1983 |

(Continued)

OTHER PUBLICATIONS

European Search Report issued Jul. 16, 2015 in European Application 14200000, filed on Dec. 23, 2014 (with English Translation).

*Primary Examiner* — James Phan
(74) *Attorney, Agent, or Firm* — Oblon, McClelland, Maier & Neustadt, L.L.P.

(57) ABSTRACT

Method for fabricating a transparent display dial for a portable object, wherein the method includes the steps of: creating a mold with a first relief pattern for imprinting a decoration on at least a first portion of the surface of the transparent display dial, and with a second relief pattern for imprinting an antireflective filter on a second portion of the surface of the transparent display dial; depositing on the dial a mixed layer of a monomer and a cross-linking agent sensitive to ultraviolet radiation; applying the mold on the mixed monomer and cross-linking agent layer; solidifying the mixed monomer and cross-linking agent layer by photopolymerization under ultraviolet irradiation through the mold, and after insolation, removing the mold. The invention also concerns a transparent display dial obtained according to the method of the invention.

3 Claims, 2 Drawing Sheets

(56) References Cited

FOREIGN PATENT DOCUMENTS

JP          2-75991     3/1990
JP      2008157827 A   *   7/2008  ............. G02B 19/06

\* cited by examiner

METHOD FOR FABRICATING A DISPLAY DIAL FOR A PORTABLE OBJECT SUCH AS A TIMEPIECE AND DISPLAY DIAL OBTAINED THEREBY

This application claims priority from European Patent Application No. 14200000.9 filed Dec. 13, 2014, the entire disclosure of which is hereby incorporated herein by reference.

FIELD OF THE INVENTION

The present invention concerns a display dial for a portable object such as a timepiece. More specifically, the present invention concerns a display dial for a wristwatch, a digital display device being arranged underneath the dial. The present invention also concerns a method for fabricating such a display dial.

BACKGROUND OF THE INVENTION

Namely a dial for a portable object such as a timepiece made, for example, of a transparent plastic material. A semi-transparent layer is, for example, printed on an upper surface of the dial facing the user's side so as to conceal from the user's view the components, such as a solar cell, disposed under the surface of the dial. A fraction of the upper surface of the dial is left clear of any printing so as to provide a transparent aperture. A digital display device, such as a liquid crystal display cell, is adhesive bonded under the surface of the dial, plumb with the aperture, so that the information displayed by the liquid crystal display device can be read by the user.

The drawback of this type of dial is that it is not possible to give it a particular finish with the aid of conventional mechanical finishing means. Indeed, let us imagine, for example, that it is desired to brush the dial using a metal brush in order to form fine lines in the dial which will radiate out from the centre of the dial. These fine lines, through the phenomenon of light reflection, will give the dial a shimmering and changing appearance. Unfortunately, it is understood that in the case of a dial which has one portion that must remain transparent, it is not possible to perform such a mechanical brushing treatment. Indeed, it is impossible to stop the brushing when the brush passes in proximity to the transparent aperture to prevent the brush scratching the aperture, which would make it difficult to read the information displayed by the digital display device. It is thus clear that in the case of a dial made of transparent material having one portion that must remain transparent, it is not possible to apply mechanical finishing operations to such a dial, which considerably limits the final appearance that can be given to the dial.

Moreover, since the digital display device is directly bonded under the surface of the dial, plumb with the transparent aperture, it is also necessary to provide this aperture with an antireflective layer in order to ensure good readability of the information displayed by the digital display device.

SUMMARY OF THE INVENTION

It is an object of the present invention to overcome the aforementioned drawbacks, in addition to others, by providing a method for fabricating a transparent display dial for a portable object wherein it is possible, in particular, to give the transparent display dial a given finish while preserving the transparency properties of at least one area of the transparent display dial.

To this end, the present invention concerns a method for fabricating a transparent display dial for a portable object, the method including the following steps:

creating a mould with a first relief or 3D pattern corresponding to a first decoration intended to be imprinted on at least a first portion of the surface of the transparent display dial, and with a second relief or 3D pattern corresponding to an antireflective filter intended to be imprinted on a second portion of the surface of the transparent display dial;

depositing on the dial a layer of a mixture of a monomer and a cross-linking agent sensitive to ultraviolet radiation;

applying the mould on the mixed monomer and cross-linking agent layer in order to imprint the first and second relief patterns in the layer;

solidifying the mixed monomer and cross-linking agent layer by photopolymerization under ultraviolet irradiation through the mould, and after insolation, removing the mould.

As a result of these features, the present invention provides a method for fabricating a transparent display dial for a portable object such as a wristwatch which, in a single fabrication step, allows a decoration to be structured on at least one portion of the surface of the dial, whereas another portion of the dial surface, which is intended to form a viewing aperture for a digital display device placed under the dial, plumb with the aperture, receives an antireflective filter.

Owing to the invention, it is therefore possible for the first time, to the

Applicant's knowledge, to make available to the market transparent display dials having at least one area that remains transparent so as to delimit a viewing aperture for a device arranged under the dial, whereas at least another fraction of the dial surface is coated with a relief or 3D decoration.

Further, as a result of the method of the invention, complete freedom can be enjoyed as regards the type of decoration that it is possible to apply on the transparent display dial.

It should also be noted that the method of the invention is implemented at ambient temperature, with a high duplication speed and precise alignment.

Finally, because the simultaneous printing of the relief decoration and the antireflective filter occurs at ambient temperature, this is a method which is economical since it does not require heating the dials, fast since it is not necessary to wait for the dials to cool after printing and which, above all, does not impose any limitation on the choice of material used to make the transparent display dial.

The invention also concerns a transparent display dial for a portable object, this transparent display dial including on at least a first portion of its surface a decoration created by cold imprinting (that is to say at ambient temperature) assisted by ultraviolet radiation, a technique also known by the name of "UV-assisted imprinting" or "UV-assisted nano-imprinting" according to the size of the patterns desired to be imprinted, the second portion of the transparent display dial surface including an antireflective filter formed by cold UV-assisted imprinting so as to delimit a viewing aperture.

Finally, as regards the antireflective filter, the transparent display dial forms the substrate for this filter. It is not, therefore, necessary to structure the antireflective filter on a substrate, and then to bond the assembly thereby obtained on the dial, which makes it possible to reduce the thickness of the resulting dial.

BRIEF DESCRIPTION OF THE DRAWINGS

Other features and advantages of the present invention will appear more clearly from the following detailed description of an implementation of the method according to the invention, this example being given purely by way of non-limiting illustration with reference to the annexed drawing, in which.

DETAILED DESCRIPTION OF ONE EMBODIMENT OF THE INVENTION

The present invention proceeds from the general inventive idea which consists in simultaneously coating, by cold UV-assisted imprinting, a transparent display dial for a portable object such as a wristwatch, with a decorative pattern on at least one portion of the dial surface, and also with an antireflective filter on another portion of the dial surface. To the applicant's knowledge, on the market there is no dial made of a transparent material, such as plastic, glass, or sapphire, having a transparent area coated with an antireflective filter in relief or 3D so as to delimit a viewing aperture for a device arranged underneath the transparent area, while at least one portion of the remaining surface of the transparent dial is coated with a relief decoration which imitates the relief decorations with which conventional metal dials can be coated, such as engine-turning or Côtes de Genève. This remarkable result is achieved owing to the use of a cold UV-assisted imprinting method. Such a method relies on a mould that simultaneously contains a first relief pattern corresponding to the decoration to be imprinted and a second relief pattern corresponding to the antireflective filter to be imprinted. After depositing a mixed layer of monomer and cross-linking agent sensitive to ultraviolet radiation on the surface of the transparent display dial located on the user's side, the mould is applied to the layer so as to transfer into the layer the first and second relief patterns borne by the mould. The mixed monomer and cross-linking agent layer is then solidified by ultraviolet radiation through the mould, and the mould is then removed.

Figure 1:
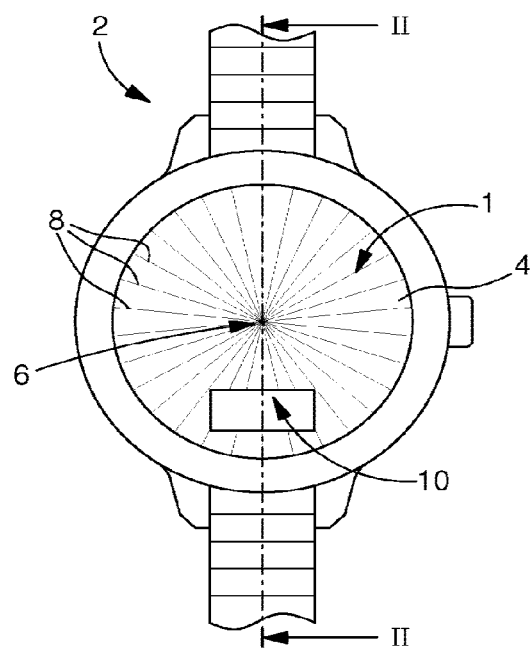
FIG. 1 is a plan view of a wristwatch equipped with a transparent display dial according to the invention.
Figure 2:
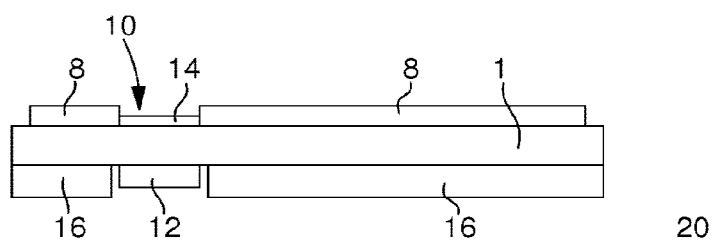
FIG. 2 is a sectional view of the transparent display dial of FIG. 1 along a midday—6 o'clock axis.

FIG. 1 is a plan view of a transparent display dial according to the invention. Designated as a whole by the general reference numeral 1, this transparent display dial is intended to equip a portable object such as a wristwatch 2. Transparent display dial 1 includes on at least a first portion of its surface 4, a relief or 3D decoration 6 created by cold ultraviolet assisted imprinting. In the example shown, relief decoration 6 is formed of fine lines 8 which radiate out from the centre of transparent display dial 1. Transparent display dial 1 also includes a transparent aperture 10 allowing the user to see a device, such as a liquid crystal display cell 12, placed under the transparent viewing aperture 10 (see FIG. 2). To enable the user easily to read the information displayed by liquid crystal display cell 12, transparent aperture 10 is coated with an antireflective filter 14. As explained in detail below with reference to FIGS. 3A to 3D, this antireflective filter 14 is structured at the same time as relief decoration 6 by means of a cold ultraviolet-assisted imprinting method. The antireflective effect of antireflective filter 14 is typically insured by nanometric structures, for example of the "moteye" type, wherein the light falling on transparent aperture 10 does not perceive a sudden change in the refractive index but rather a gradual change. Indeed, due to their dimensions, the nanometric structures are perceived by the light as forming a mean refractive index since the wavelength of the incident light is greater than the periodicity of the nanometric structure. Finally, it is possible, for example, to arrange under transparent display dial 1 a solar cell 16 intended, in a non-limiting manner, to charge an accumulator housed inside the watch case.

The various steps of the method for fabricating a transparent display dial according to the invention will now be examined with reference to FIGS. 3A to 3D.

Figure 3A:
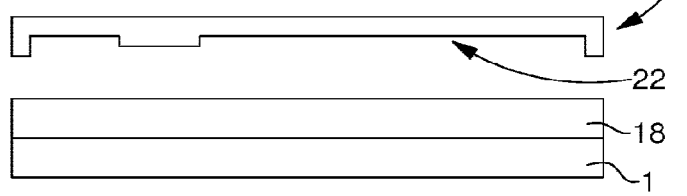
FIGS. 3A to 3D illustrate a method for fabricating the transparent display dial of FIG. 1 by cold ultraviolet-assisted imprinting.

In FIG. 3A, a mixed layer 18 of a monomer and a cross-linking agent sensitive to ultraviolet radiation is deposited on transparent display dial 1. Further, a printing mould 20 is positioned above transparent display dial 1. This printing mould 20 is made of an elastomer material transparent to ultraviolet radiation, such as polydimethylsiloxane or PDMS. This printing mould 20 bears a cavity or footprint 22 which corresponds to the negative image of relief decoration 6 and of antireflective filter 14 desired to be printed on the surface of transparent display dial 1. This printing mould 20 may be a master mould, that is to say an original mould. However, such a master mould is expensive to create. It is also fragile, so that if used repeatedly, it is likely to wear out rapidly. This is why it is preferable to work with printing moulds 20 that are copies of the master mould. It is understood that if the cavity of the master mould corresponds to the positive image of relief decoration 6 and of antireflective filter 14 desired to be printed, the cavity of printing mould 20 obtained by copying the master mould will correspond to the negative image desired to be obtained.

Figure 3B:
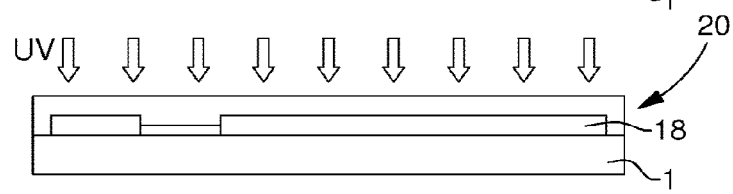

In FIG. 3B, the cavity 22 of printing mould 20 is lightly pressed onto mixed layer 18 and the mixture is solidified at ambient temperature by photopolymerization under ultraviolet irradiation through printing mould 20.

Figure 3C:
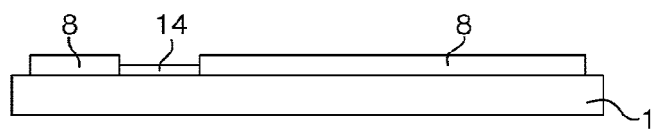

In FIG. 3C, after insolation, the relief decoration 6 and antireflective filter 14 are imprinted in mixed layer 18 and printing mould 20 is easily detached from the solidified mixed layer 18.

It will be understood that, since the cavity of printing mould 20 that is pressed onto mixed layer 18 corresponds to the negative image desired to be obtained, a positive imprint of relief decoration 6 and antireflective filter 14 is produced in this mixed layer 18.

Figure 3D:
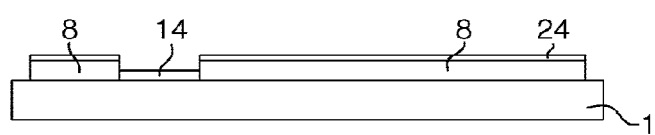
Figure 4A:
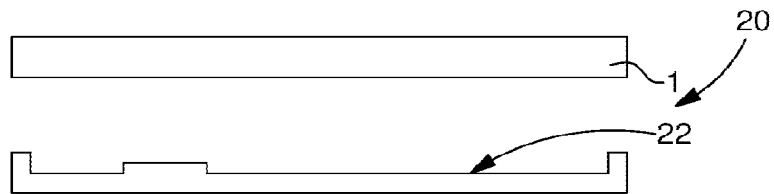
FIGS. 4A to 4D illustrate a variant of the method for fabricating the transparent display dial of FIG. 1.
Figure 4B:
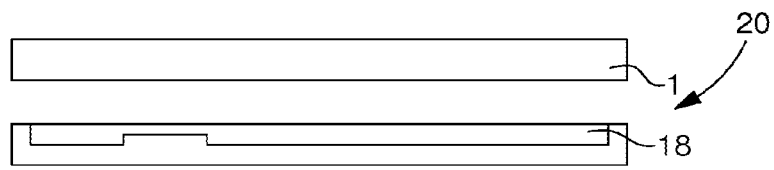
Figure 4C:
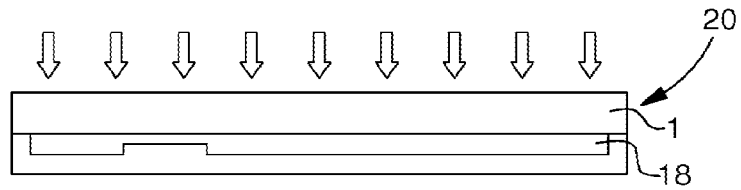
Figure 4D:
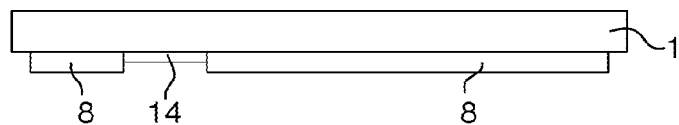

Finally, in FIG. 3D, the lines 8 which form relief decoration 6 are coated with a thin semi-transparent, for example metal layer 24, which allows light to pass towards the solar cell but which conceals the latter from the user's view.

It goes without saying that this invention is not limited to the embodiment that has just been described and that various simple modifications and variants can be envisaged by those skilled in the art without departing from the scope of the invention as defined by the annexed claims. In particular, it will be understood that within the meaning of the present invention, "decoration" means both a decorative pattern and a functional pattern such as a marking, a number or even a graduation of an hour-circle.

It will also be understood that within the meaning of the present invention, it is sufficient for the dial to be transparent and for a transparent aperture coated with an antireflective film to be arranged in the dial and for at least one portion of the remaining surface of the transparent display dial to be coated with a decorative pattern in relief. What is placed under the surface of the dial is of no importance for the invention. It may be a solar cell, an information display device, a timepiece movement or other element.

According to another variant of the invention (see FIGS. 4A to 4D), cavity 22 of printing mould 20 obtained by copying the master mould corresponds to the negative of the image desired to be obtained. Printing mould 20 is then placed upside down, and there is then deposited on cavity 22 of printing mould 20 a mixed layer 18 of a monomer and a cross-linking agent sensitive to ultraviolet radiation. Display dial 1 is then positioned above printing mould 20, on the side of cavity 22. Finally, the mixed monomer and cross-linking agent layer 18 is subjected to cold insolation (in other words at ambient temperature) by means of ultraviolet radiation through transparent display dial 1. When mixed layer 18 is polymerised, printing mould 20 is removed.

LIST OF PARTS

Transparent display dial 1
Wristwatch 2
Surface 4
Relief or 3D decoration 6
Fine lines 8
Transparent aperture 10
Liquid crystal display cell 12
Antireflective filter 14
Solar cell 16
Mixed layer 18
Printing mould 20
Cavity 22
Thin semi-transparent layer 24

What is claimed is:

1. A method for fabricating a transparent display dial for a portable object, wherein the method comprises the steps of:
    creating a mould bearing a cavity or footprint formed of a first relief or 3D pattern for imprinting a decoration on at least a first portion of the surface of the transparent display dial, and of a second relief or 3D pattern for imprinting an antireflective filter on a second portion of the surface of the transparent display dial;
    depositing on the dial a mixed layer of a monomer and a cross-linking agent sensitive to ultraviolet radiation;
    applying the cavity of the mould on the mixed monomer and cross-linking agent layer;
    solidifying the mixed monomer and cross-linking agent layer by photopolymerization under ultraviolet irradiation through the mould, and
    after insolation, removing the mould.

2. A method for fabricating a transparent display dial for a portable object, wherein the method comprises the steps of:
    creating a mould bearing a cavity or footprint formed of a first relief or 3D pattern for imprinting a decoration on at least a first portion of the surface of the transparent display dial, and of a second relief or 3D pattern for imprinting an antireflective filter on a second portion of the surface of the transparent display dial;
    placing the printing mould upside down, and then depositing on the cavity of the printing mould a mixed layer of a monomer and a cross-linking agent sensitive to ultraviolet radiation;
    positioning the transparent display dial on the printing mould, on the side of the cavity;
    solidifying the mixed monomer and cross-linking agent layer by photopolymerization under ultraviolet irradiation through the transparent display dial, and
    after insolation, removing the mould.

3. A transparent display dial for a portable object, wherein the transparent display dial includes on a first portion at least of the surface thereof a decoration created by cold ultraviolet-assisted imprinting, wherein a second portion of the surface of the transparent display dial includes an antireflective filter also created by cold ultraviolet-assisted imprinting so as to delimit a transparent aperture.

* * * * *